(12) United States Patent
Finster et al.

(10) Patent No.: US 11,809,170 B2
(45) Date of Patent: Nov. 7, 2023

(54) INDUSTRIAL AUTOMATION SYSTEM DEVICE WITH SECURE COMMUNICATION, SYSTEM AND METHOD

(71) Applicant: ABB Schweiz AG, Baden (CH)

(72) Inventors: Soeren Finster, Karlsruhe (DE); Florian Kohnhaeuser, Riedstadt (DE)

(73) Assignee: ABB Schweiz AG, Baden (CH)

( * ) Notice: Subject to any disclaimer, the term of this patent is extended or adjusted under 35 U.S.C. 154(b) by 149 days.

(21) Appl. No.: 17/393,420

(22) Filed: Aug. 4, 2021

(65) Prior Publication Data

US 2022/0043428 A1 Feb. 10, 2022

(30) Foreign Application Priority Data

Aug. 7, 2020 (EP) .................................. 20 190 043

(51) Int. Cl.
*G05B 19/418* (2006.01)
*H04L 9/08* (2006.01)
*H04L 9/14* (2006.01)
*H04L 9/32* (2006.01)

(52) U.S. Cl.
CPC ........ *G05B 19/4185* (2013.01); *H04L 9/0825* (2013.01); *H04L 9/14* (2013.01); *H04L 9/3263* (2013.01)

(58) Field of Classification Search
CPC ........ H04L 9/0825; H04L 9/14; H04L 9/3263
See application file for complete search history.

(56) References Cited

U.S. PATENT DOCUMENTS

| | | | | |
|---|---|---|---|---|
| 2014/0032909 A1* | 1/2014 | Steele | ..................... | H04L 9/321 |
| | | | | 713/150 |
| 2015/0095648 A1* | 4/2015 | Nix | .......................... | H04L 9/32 |
| | | | | 713/170 |
| 2018/0323977 A1* | 11/2018 | Hojsik | .................. | H04L 63/061 |
| 2019/0124050 A1* | 4/2019 | Scheffer | ................ | G06F 9/5077 |

(Continued)

FOREIGN PATENT DOCUMENTS

| | | |
|---|---|---|
| CA | 3073647 A1 | 3/2019 |
| CN | 106411528 A | 2/2017 |

(Continued)

OTHER PUBLICATIONS

Anonymous, "OPC Unified Architecture—Part 6: 1-15 Mappings," IEC 62541-6:2020, IEC, Jul. 2020, pp. 1-242, Edition 3, ICE, Geneva, Switzerland.

*Primary Examiner* — Darshan I Dhruv
(74) *Attorney, Agent, or Firm* — Leydig, Voit & Mayer, Ltd.

(57) ABSTRACT

An industrial automation system device includes: a secure communication processing unit for communicating securely with a further trusted industrial automation system device; and a pre-shared secret module including a pre-shared secret, the pre-shared secret including shared asymmetric key pair generation data. The secure communication processing unit: derives a shared asymmetric key pair including a shared secret key and a shared public key from the shared asymmetric key pair generation data, derives a shared certificate including the shared public key, signs the shared certificate with the derived shared secret key, and generates a device asymmetric key pair including a device secret key and a device public key.

15 Claims, 4 Drawing Sheets

(56) References Cited

U.S. PATENT DOCUMENTS

2019/0205773 A1\* 7/2019 Ackerman .............. G06F 21/64
2020/0259668 A1\* 8/2020 Loreskar ................ G06F 21/53
2020/0344075 A1\* 10/2020 Gremaud .............. H04L 9/0894

FOREIGN PATENT DOCUMENTS

| CN | 109547197 A | | 3/2019 |
|----|-------------|---|--------|
| EP | 2865168 B1 | | 6/2016 |
| EP | 3182674 B1 | | 3/2019 |
| EP | 3598713 A1 | | 1/2020 |
| EP | 3700160 A1 | * | 8/2020 |

\* cited by examiner

| Field | Default Value for $C_{CA}$ | Default Value for $C_i$ |
|---|---|---|
| Version | V3 | V3 |
| Serial Number | 1 | *random integer* |
| Signature Algorithm | sha256RSA | sha256RSA |
| Signature Hash Algorithm | sha256 | sha256 |
| Issuer | CN="ABB_PSS_CONVERSION" | CN="ABB_PSS_CONVERSION" |
| Valid from | *FIXED VALUE* | *FIXED VALUE* |
| Valid to | 9999-12-31T23:59:59Z | 9999-12-31T23:59:59Z |
| Subject | CN=" ABB_PSS_CONVERSION" | CN="ABB_PSS_CONVERSION" |
| Public Key | $pk_{CA}$ | $pk_i$ |
| Public Key Parameters | $pk_{CA}$'s parameters | $pk_i$'s parameters |
| Basic Constraints | Subject Type=CA, Path Length Constraint=0 | Subject Type=End Entity, Path Length Constraint=None |
| Subject Alternative Name |  | (URL= urn:[APPLICATION_NAME]:[HOSTNAME]; DNS Name=[HOSTNAME]) |
| Subject Key Identifier | Hash($pk_{CA}$) | Hash($pk_i$) |
| Authority Key Identifier | KeyID= Hash($pk_{CA}$) | KeyID= Hash($pk_i$) |
| Key Usage | Certificate Signing (fc) | Digital Signature, Non-Repudiation, Key Encipherment, Data Encipherment |
| Thumbprint | Fingerprint of certificate | Fingerprint of certificate |

Fig. 5

INDUSTRIAL AUTOMATION SYSTEM DEVICE WITH SECURE COMMUNICATION, SYSTEM AND METHOD

CROSS-REFERENCE TO PRIOR APPLICATION

Priority is claimed to European Patent Application No. EP 20 190 043.8, filed on Aug. 7, 2020, the entire disclosure of which is hereby incorporated by reference herein.

FIELD

The present invention relates to an industrial automation system device comprising a secure communication processing unit configured to communicate securely with a trusted further industrial automation system device, an industrial automation system comprising such a device, and a method for secure communication in an industrial automation system.

BACKGROUND

In industrial automation systems, a secure device to device communication may be required. Communication protocols such as OPC UA provide such a secure communication. Before initiating secure communication in OPC UA, each application in the system requires cryptographic assets such as an asymmetric key pair and an Application Instance Certificate for the key pair. Initial deployment and management of these cryptographic assets is complex, error-prone, and laborious. Therefore, an improved system and method are desired to simplify the secure communication set-up thereby reducing costs and effort.

SUMMARY

In an embodiment, the present invention provides an industrial automation system device, comprising: a secure communication processing unit configured to communicate securely with a further trusted industrial automation system device; and a pre-shared secret module comprising a pre-shared secret, the pre-shared secret comprising shared asymmetric key pair generation data, wherein the secure communication processing unit is configured to: derive a shared asymmetric key pair comprising a shared secret key and a shared public key from the shared asymmetric key pair generation data, derive a shared certificate comprising the shared public key, sign the shared certificate with the derived shared secret key, and generate a device asymmetric key pair comprising a device secret key and a device public key.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

The described embodiments similarly pertain to the industrial automation system device, the industrial automation system, and the method for secure communication in an industrial automation system. Synergetic effects may arise from different combinations of the embodiments although they might not be described in detail.

Further on, it shall be noted that all embodiments of the present invention concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

For secure communication, an industrial automation system application such as an OPC UA application requires a unique asymmetric key pair and, in case of OPC UA, an associated Application Instance Certificate. The public part of the key is stored in a field of the Application Instance Certificate and is therefore distributed with the Application Instance Certificate whereas the private part of the key is kept secret. With the public key of a communication partner, an application can verify the partner's identity, check its message signatures, and encrypt messages for it. In current praxis, keys and Application Instance Certificates are either generated by the application itself or are provided to the application by an administrator. Each application stores its certificates in the so-called Certificate Store, which contains a separate location for own certificates and trusted certificates—the latter is called Trust List. When a client and a server initiate a secure communication, they first mutually authenticate themselves. To this end, client and server mutually exchange and verify their Application Instance Certificates. To verify the certificate of a communication partner, an OPC UA application must either (i) directly store the certificate in the Trust List, or (ii) store an intermediate Certificate (e.g., issued by a Certificate Authority (CA)) that allows to establish trust in the certificate of the communication partner by verifying a chain of certificates. Thus, before initiating secure connections, according to current practice, OPC UA applications must first set up their Certificate Store with the appropriate keys and certificates for themselves as well as all their communication partners. However, establishing and managing the Certificate Store of devices either involves a significant effort and complexity or provides an insufficient level of security.

According to a first aspect, an industrial automation system device is provided comprising a secure communication processing unit, which is configured to communicate securely with a further trusted industrial automation system device, and further comprising a pre-shared secret module comprising a pre-shared secret. The pre-shared secret comprises shared asymmetric key pair generation data. The secure communication processing unit is configured to derive a shared asymmetric key pair, comprising a shared secret key sk_CA and a shared public key pk_CA from the shared asymmetric key pair generation data, to derive a shared certificate C_CA comprising the shared public key pk_CA, and to sign the shared certificate C_CA with the derived shared secret key sk_CA. The secure communication processing unit is further configured to generate a device asymmetric key pair comprising a device secret key sk_i and a device public key pk_i, to derive a device certificate C_i comprising the device public key pk_i and signed with the shared secret key, and to trust the further device based on the shared certificate C_CA and to communicate securely with the further device based on the device certificate and the device key pair.

The secure communication unit may further be configured to derive a device certificate C_i comprising the device public key pk_i and signed with the shared secret key.

The term "shared" indicates here the usage also by other devices. E.g., the shared asymmetric key pair used by the industrial automation system device and the further device. "Shared" does, however, in general not necessarily mean, that the asymmetric key pair is transmitted or that a further device has access to the asymmetric key pair. Only devices that should be able communicate securely have the shared keys and certificates. Other devices must not have access to the shared keys and certificates, as this would break security. Particularly, in this disclosure, the shared keys and certificates are generated by each device itself based on the pre-shared secret.

The secure communication processing unit provides the processing means to generate or derive the security-related keys and certificates. It may also be responsible for authenticating the further device, signing messages and certificates, and for encoding and decoding of messages communicated to and from the further device.

"Device public key", "device secret key", and "device certificate" means device specific public key, secret key, and certificate, respectively. In contrast to the shared items, the device specific items are individually generated or derived by the device and comprises device specific information or data. For example, the device certificate may comprise device-related data, whereas the shared certificate does not.

The term "pre-shared secret" is used in singular form. However, the "pre-shared secret" may comprise a number of different information types. Similarly, the "further device" may be representative for a number of further devices. The industrial automation system device may communicate with several trusted further devices at the same time.

The industrial automation system device is therefore configurable by means of the pre-shared secret with data or information with which it can provide itself with keys and certificates, and some of the keys and certificates, namely the shared private key and the shared certificate represent a basis of trust when initiating a communication with other devices in both directions. In particular, the shared certificate represents a root certificate, and the device trusts all certificates, for example device certificates, that are signed with the root certificate, or to be more precise, that are signed with the shared private key related to the root certificate. Furthermore, the device is capable to generate itself the device specific keys and generate itself the device specific certificate for authentication and secure communication.

According to an embodiment, the industrial automation system device is an OPC Unified Architecture (OPC UA) device. According to the OPC UA, before initiating secure communications, each OPC UA application requires three cryptographic assets: (i) a unique asymmetric key pair, (ii) an Application Instance Certificate for the key pair, including necessary intermediate certificates to establish a chain to a root certificate, and (iii) a list of trusted certificates that enable the verification of Application Instance Certificates for communication partners. The unique asymmetric key pair corresponds to the device key pair, the Application Instance Certificate therefore corresponds to the device certificate, which is signed by the shared certificate, which is the root certificate, and the list of trusted certificates comprises the root or shared certificate, respectively.

According to an embodiment, the pre-shared secret further may comprise shared certificate related information. The communication processing unit is configured to derive the shared certificate C_CA from the shared certificate related information of the pre-shared secret. Such certificate related information may comprise, for example the validity period or the issuer. This option allows to bundle all configuration data related to the authentication and secure communication at one place and to reduce the effort for deploying and maintaining two or more separate configurations.

Alternatively, in a further embodiment, the device certificate C_i comprises pre-configured default data. This option allows to reduce the amount of data that has to be stored with the pre-shared secret.

According to an embodiment, the key generation algorithm for generating the shared asymmetric key pair (sk_CA, pk_CA) is an algorithm identical to that used by the further device, so that an identical key pair is obtained, and an identical certificate, namely the shared certificate C_CA is obtained. There may be several different key generation algorithms. The pre-shared secret may be configured with, for example, a number, where the number prescribes which algorithm to use, so that it is guaranteed that the further device having the same pre-shared secret uses the same algorithm.

According to an embodiment, the pre-shared secret provides a sufficient entropy to derive the shared asymmetric key pair (sk_CA, pk_CA) in a cryptographically secure way.

According to an embodiment, the secure communication processing unit is further configured to use a regular entropy source for generating the device key pairs. That is, the seed for generating the keys is based on random data in a usual way.

According to an embodiment, the industrial automation system device further comprises a certificate store, comprising the device certificate, and a trust list comprising the shared certificate.

According to an embodiment, the certificate related information of the pre-shared secret comprises one or more of the following: subject name, validity period, certificate signature algorithm, version, serial number, signature hash algorithm, issuer, public key, public key parameters, basic constraints, alternative name, subject key identifier, authority key identifier, key usage and/or thumbprint. However, the pre-shared secret may not be limited to this information but may comprise further items.

According to an embodiment, the certificate related information for the shared certificate and the device certificate of the pre-shared secret are each interpreted as X.509 certificate, which is an ITU-T standard for a public key infrastructure (PKI) for creating digital certificates.

According to an embodiment, the pre-shared secret is provided to the device by pre-configuration or through an external access interface. The external access interface may be a remote interface, e.g. using TCP or UDP. Further, it may be a wired interface, where, for example the device is connected directly to a programming device, either with or without usage of a network, or a wireless interface. The access to the device via the external interface may be secured, for example by an access or network password. In this case, the pre-shared secret information may for example be stored in flash memory. By using an external access interface it is possible to separate the step of configuration from the step of manufacturing the hardware. Furthermore, updates and modifications of the pre-shared secret are possible.

Alternatively, the pre-shared secret may be stored in a ROM, which is implemented into the device when manufacturing the hardware. As a further alternative, the default values or at least basic data of the pre-shared secret may be provided in a ROM, which is read on command into a flash memory. The command may be signaled at a first usage of the device or when resetting the device. The flash memory may then be overwritten using, for example, an external access interface.

The size of the pre-shared secret may be minimized in size by encoding techniques such as Packed Encoding Rules (PER), CeltiXFire (CXF) coding scheme or other known techniques.

According to a further aspect, an industrial automation system comprising at least one industrial automation system device as described above is provided. The system may, for example, be built up according to a client-server architecture and comprise one or more servers to which clients may connect.

According to an embodiment, at least the further trusted device comprises an identical pre-shared secret for deriving identical asymmetrical shared key pairs and an identical shared certificate. That is, other devices may be configured with the pre-shared secret. The devices may inter-operate automatically. Those devices that have same pre-shared secret-generated root of trust have valid certificates including variables as for example IP address and hostname. Further, these devices have certificates signed by the root of trust, so that they can connect to each other and communicate with each other. If, however the pre-shared secrets configuration differ, also the roots of trust differ and the authentication will fail. In this case, no connection is possible.

According to a further aspect, a method for secure communication in an industrial automation system is provided, comprising the following steps. In a first step a pre-shared secret comprising asymmetric key pair generation data is provided. In a second step, deriving a shared asymmetric key pair, comprising a shared secret key sk_CA and a shared public key pk_CA from the asymmetric key pair generation data is derived. In a third step, a shared certificate C_CA comprising the shared public key pk_CA is derived. In a fourth step, the shared certificate C_CA is signed using the derived shared secret key sk_CA. In a fifth step, a device asymmetric key pair comprising a device secret key sk_i and a device public key pk_i is generated. In a sixth step, a device certificate C_i comprising the device public key pk_i and signed with the shared secret key is generated.

According to an embodiment, in a seventh step, the further device is trusted based on the shared certificate C_CA and a secure communication with the further device based on the shared certificate and the device key pair is provided.

The secure communication unit may further comprise a computer program element comprising instructions which are executed on a controller or processor of the secure communication unit to control the secure communication unit according to the method described above. The computer program element may be stored on a computer-readable medium.

The computer program element may be part of a computer program, but it can also be an entire program by itself. For example the computer program element may be used to update an already existing computer program to get to the present invention.

The controller may comprise circuits without programmable logics or may be or comprise a micro controller, a field programmable gate array (FPGA), an ASIC, a Complex Programmable Logic Devices (CPLD), or any other programmable logic devices known to person skilled in the art.

The computer readable medium may be seen as a storage medium, such as for example, a USB stick, a CD, a DVD, a data storage device, a hard disk, or any other medium on which a program element as described above can be stored.

The invention thus eases deployment and management of cryptographic assets required by OPC UA applications. It enables to derive all three cryptographic assets (key pairs, associated certificates, and trusted certificates) from pre-shared secrets (PSS). Thus, any given device must only hold a common PSS to establish secure OPC UA communications. As a result, complex protocols or infrastructures that aim at deploying and managing OPC UA certificates are no longer needed.

These and other features, aspects and advantages of the present invention will become better understood with reference to the accompanying figure and the following description.

The figures are only schematic and are not to scale. Basically, identical or similar parts are provided with the same reference symbols.

Figure 1:
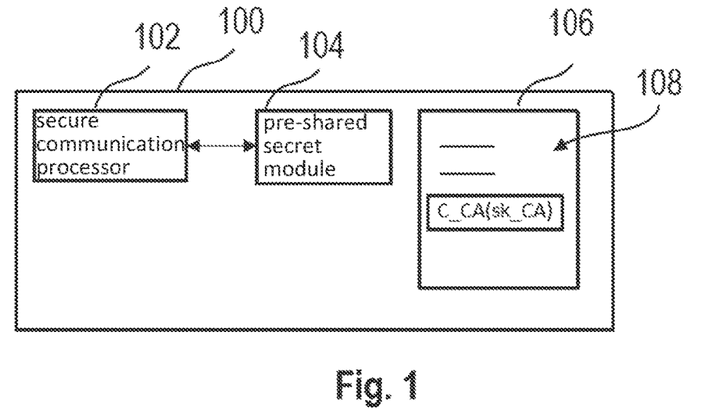
FIG. 1 shows a block diagram of an industrial automation system device according to an embodiment.

FIG. 1 shows a block diagram of an industrial automation system device 100 according to an embodiment. The device 100 comprises a secure communication processing unit 102 and a pre-shared secret module 104 comprising a pre-shared secret. The communication processing unit 102 may be a programmable logic or may be or comprise a micro controller, a field programmable gate array (FPGA), an ASIC, a Complex Programmable Logic Device (CPLD), a processor, or a processing device. The pre-shared secret module 104 may, for example be a storage, a memory device, or a part of a memory device. Preferably, the pre-shared secret module 104 is a Read Only Memory (ROM) of a flash memory, such as a EEPROM. The pre-shared secret may be logic or data stored in the pre-shared secret module 104. Furthermore, the device comprises a certificate store 106 in which trust list 108 is stored. In an industrial automation system, several such devices exist, for example implemented as a client-server architecture with one or more servers and a number of clients. In this disclosure, an industrial automation system device 100 may be a server or a client. The server and clients may communicate with each other in a secure way, wherein the security is based in a main aspect on the pre-shared secret, from which keys and certificates are generated or derived, respectively.

Figure 2:
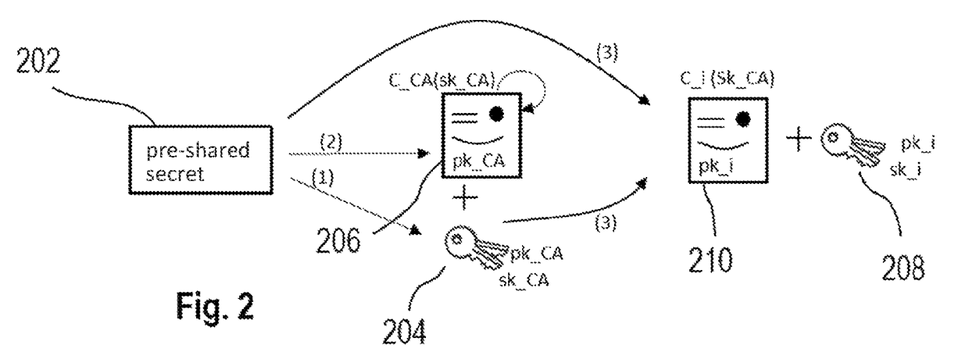
FIG. 2 shows a functional diagram according to an embodiment.

The functionalities of the blocks and modules shown in FIG. 1 are explained with reference to FIG. 2. FIG. 2 shows a functional diagram according to an embodiment. Devices store the derived certificate C_CA from operation (2) in the trust list 108 of their Certificate Store 106. Thus, all devices that have the pre-shared secret 202 trust the same (shared) certificate C_CA 206. Furthermore, in a subsequent operation (3), each device D_i generates its own device-dependent asymmetric key pair (sk_i, pk_i) 208 and its own device-dependent certificate C_i 210. The device certificate C_i 210 is signed with the shared sk_CA from operation (1) and lists the device-dependent pk_i as the subject public key.

This procedure allows all devices that share the same the pre-shared secret 202 to establish secure connections as, for example OPC UA connections, with each other. This is because the device-dependent certificates C_i, C_j, . . . , C_n 210 are all signed by the shared private key sk_CA that corresponds to the shared certificate C_CA 206, which is trusted by the devices. This enables devices to verify and establish trust in device-dependent certificates from other devices sharing the same the pre-shared secret 202.

The pre-shared secret 202, which is implemented in the device 100 by the manufacturer or which may be configured via an external interface, may comprise, for example one or two parts. In the first part shared asymmetric key pair generation data is provided. The secure communication processing unit 102 is configured to derive a shared asymmetric key pair 204, comprising a shared secret key sk_CA and a shared public key pk_CA from the shared asymmetric key pair generation data, derive a shared certificate C_CA 206 comprising the shared public key pk_CA, and to sign the shared certificate C_CA 206 with the derived shared secret key sk_CA. The secure communication processing unit 102 is further configured to generate a device asymmetric key pair 208 comprising a device secret key sk_i and a device public key pk_i, derive a device certificate C_i 210 comprising the device public key pk_i and which signed with the shared secret key. With this implementation and configuration, the secure communication processing unit 102 is enabled to make a decision on whether to trust the further device based on the shared certificate C_CA 206, since the shared certificate C_CA is related to the same private key with which the data of the further device is signed. If the further device is trusted, the devices communicate securely with the further device using the key pair 208 of the device certificate.

The pre-shared secret 202 may comprise two parts. The first part of the pre-shared secret 202 provides the necessary entropy to derive the shared cryptographically secure asymmetric key pair (sk_CA, pk_CA) 206. In an optional second part, the pre-shared secret 202 may comprise certificate related information. The secure communication processing unit is configured to derive the shared certificate C_CA 206 from the shared certificate related information of the pre-shared secret 202. The shared certificate related information may thus enable the device to derive specific fields of the shared certificate C_CA 206 and device-dependent certificates C_i, C_j, . . . , C_n 210, such as subject name, validity period, certificate signature algorithm, etc.

For example, the first part of the pre-shared secret 202 may be used as input for a cryptographically secure pseudorandom random number generator (CSPRNG). For security reasons, it is vital that the CSPRNG is provided with enough randomness and have a sufficient size. After initializing the CSPRNG with the pre-shared secret 202, the output of the CSPRNG is used as input for the key generation of the shared key pair (sk_CA,pk_CA) 204. It is noted that there may be other possibilities and techniques besides of CSPRNG to derive the certificate from a pre-shared secret. The cryptosystem used may be an RSA public-key cryptosystem or another public-key cryptosystem. In case of an RSA cryptosystem, a key size of, for example 2048 bits may be used. However, the first part of the pre-shared secret 202 may also define a different key size. When generating the asymmetric key pair 204, in case of using CSPRNG, it is crucial that (i) all entropy for the key generation comes from the CSPRNG output, which was initialized with the pre-shared secret 202, and (ii) all devices use the same key generation algorithm to generate their key pair. These requirements ensure that devices sharing the pre-shared secret 202 will generate the same key pair (sk_CA,pk_CA) 204. Note that for the generation of the device-dependent key pairs 208 and certificates 210, devices may use a regular entropy source (and not the pre-shared secret 202).

The rest of the pre-shared secret 202 may be used to derive specific fields of the shared certificate C_CA and the device-dependent certificates C_i, C_j, . . . , C_n. To this end, the second part of PSS may be interpreted, for example, as two X.509 certificates that are encoded using a predefined scheme. The size of the pre-shared secret may be minimized. To minimize the size of pre-shared secret 202, a space-efficient encoding scheme, such as PER or CXF may be used. However, further encoding methods exist that may be used. A device D_i may use the first X.509 certificate encoded in PSS to derive fields for C_CA and the second X.509 certificate to derive fields for C_i. Each encoded certificate in the pre-shared secret 202 may have blank fields, i.e. empty fields, that are filled with default values, depending on whether the certificate is used for C_CA or C_i. These default values may, in an example, be the ones shown in FIG. 5. Other, less or further fields and values are possible.

Figure 5:
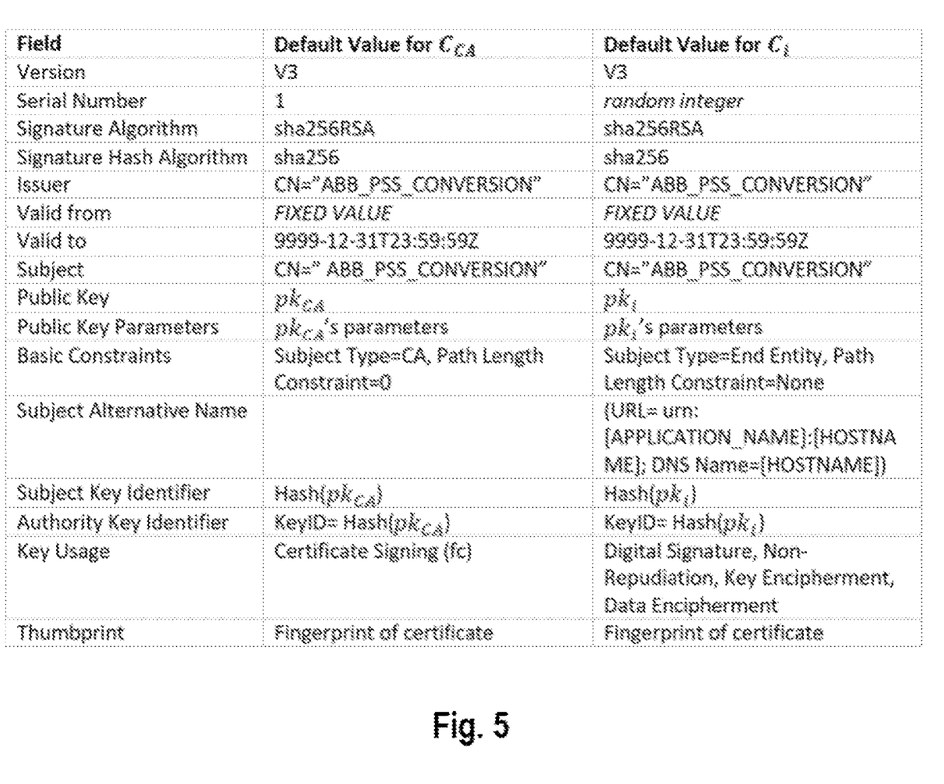
FIG. 5 shows a table with examples of fields and values of the certificates according to an embodiment.

Note that the second part of PSS can also be omitted fully to reduce the size of PSS. In this case, all derived certificates only consist of the above defined default values.

Figure 3:
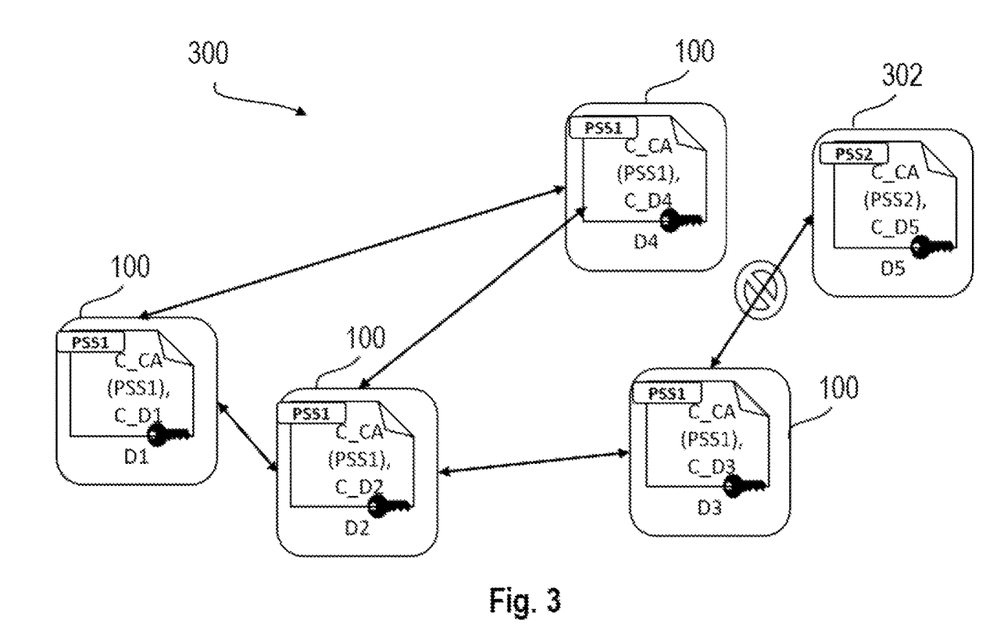
FIG. 3 shows a block diagram of an industrial automation system according to an embodiment.

FIG. 3 shows an example of an industrial automation system with industrial automation system devices 100, 302. Devices 100 (D1, D2, D3, D4) comprise an identical pre-shared secret PSS1 for deriving identical asymmetrical shared key pairs and an identical shared certificate. That is, other devices may be configured with the pre-shared secret. The devices may inter-operate automatically. Those devices that have same pre-shared secret-generated root of trust, i.e. devices 100 (D1, D2, D3, D4), have the same valid shared root certificate C_CA (PSS1). Further, these devices 100 (D1, D2, D3, D4), have certificates (C D1, C_D2, C_D3, C_D4 signed by the root of trust C_CA (PSS1), so that they may connect to each other and communicate with each other. If, however the pre-shared secret configurations differ such as in case of D5, which has a different pre-shared secret PSS2 and thus a different shared certificate C_CA (PSS2), then also the roots of trust differ and the authentication will fail. In this case, no connection is possible.

Figure 4:
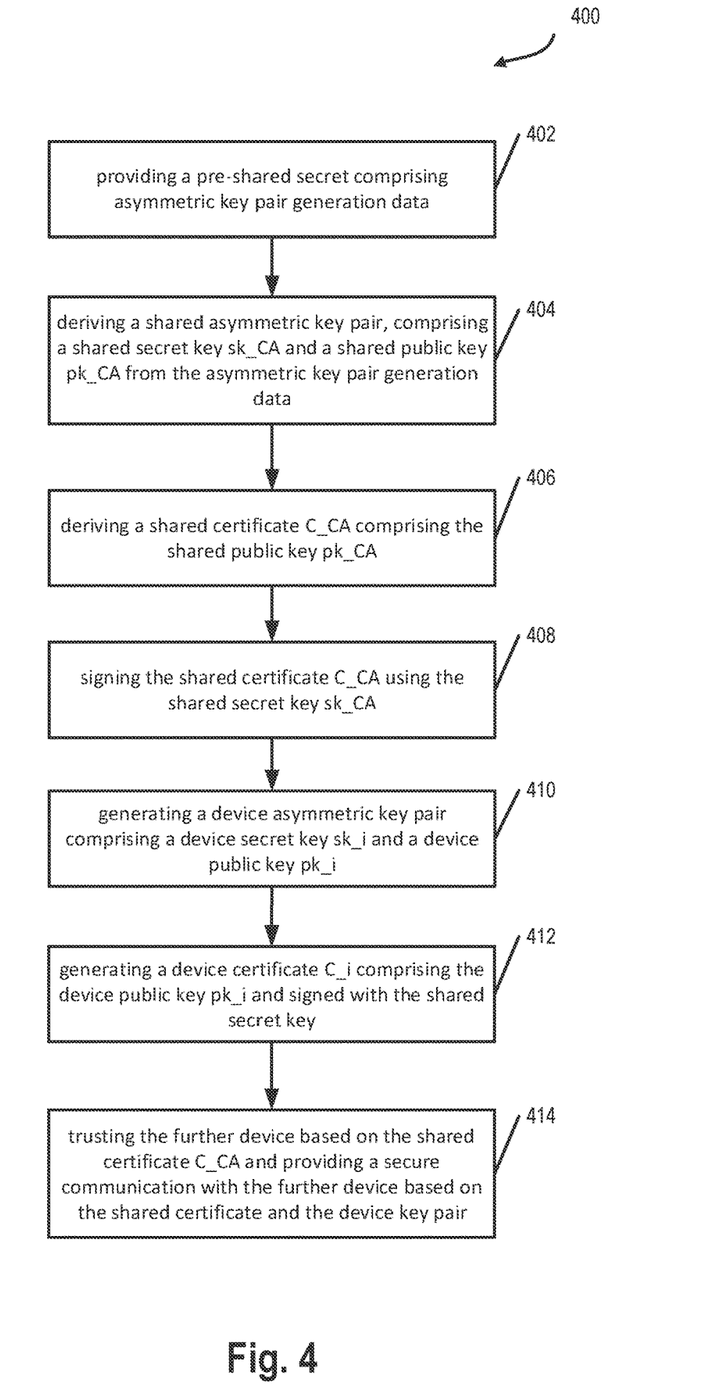
FIG. 4 shows a flow diagram of a method according to an embodiment.

FIG. 4 shows a flow diagram of the method for secure communication in an industrial automation system. In step 402 a pre-shared secret comprising asymmetric key pair generation data is provided. In a second step 404, deriving a shared asymmetric key pair, comprising a shared secret key sk_CA and a shared public key pk_CA from the asymmetric key pair generation data is derived. In a third step 406, a shared certificate C_CA comprising the shared public key pk_CA is derived. In a fourth step 408, the shared certificate C_CA is signed using the derived shared secret key sk_CA. In a fifth step 410, a device asymmetric key pair comprising a device secret key sk_i and a device public key pk_i is generated. In a sixth step 412, a device certificate C_i comprising the device public key pk_i and signed with the shared secret key is generated, and in a seventh step 414, the further device is trusted based on the shared certificate C_CA and a secure communication with the further device based on the shared certificate and the device key pair is provided.

The method eases the installation and management of certificates such as OPC UA Application Instance Certificates and their corresponding keys in the OPC UA Certificate Store. The method enables deriving shared certificates and keys from a pre-shared secret. Thus, Certificate Authorities (CA) certificates or self-signed Application Instance Certificates must no longer be managed and distributed, which makes it redundant to maintain a PKI. Instead, communication partners must only share the same PSS. In an example, the method may be used for the secure deployment of devices in a "build to order" scenario with a Global Discovery Server, GDS. For example, an operator orders devices from a manufacturer. When ordering, the operator specifies a pre-shared secret that is then configured into the devices by the manufacturer. The operator maintains a GDS, which manages the provisioning of devices. This GDS is also provided with the PSS by the operator. When the ordered devices are deployed in the operator's network, the shared PSS enables devices and GDS to establish a secure OPC UA connection. Based on the secure connection, the GDS then performs a provisioning of the devices. A traditional secure device provisioning (without this invention) would require a PKI that supplies both devices and GDS with the necessary certificates before deployment at the operator's site.

In a further example, the method can be used beyond device provisioning. After the device is deployed at the operator's site, the operator securely connects to the device using an OPC UA client and the given pre-shared secret. Next, the operator sets a new pre-shared secret in the device. Client and server then regenerate their keys and certificates based on the new pre-shared secret. Finally, the operator uses the new pre-shared secret for any subsequent secure OPC UA communication with the device. With the described approach, neither a PKI nor a GDS is required to deploy and manage secure OPC UA connections with devices.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An industrial automation system device, comprising:
   a secure communication hardware processor configured to communicate securely with a further trusted industrial automation system device; and
   a pre-shared secret module comprising a pre-shared secret, the pre-shared secret comprising shared asymmetric key pair generation data,
   wherein the secure communication hardware processor is configured to:
   derive a shared asymmetric key pair comprising a shared secret key and a shared public key from the shared asymmetric key pair generation data;
   derive a shared certificate comprising the shared public key;
   sign the shared certificate with the shared secret key;
   generate a device asymmetric key pair comprising a device secret key and a device public key; and
   derive a device certificate comprising the device public key and signed with the shared secret key.

2. The industrial automation system device of The industrial automation system device of further comprising:
   an OPC Unified Architecture device,
   wherein the device certificate comprises a device specific Application Instance Certificate, and wherein the shared certificate comprises a shared Application Instance Certificate.

3. The industrial automation system device of claim 1, wherein the pre-shared secret further comprises shared certificate related information, and
   wherein the communication hardware processor is configured to derive the shared certificate from the shared certificate related information of the pre-shared secret.

4. The industrial automation system device of claim 1, wherein the device certificate comprises pre-configured default data.

5. The industrial automation system device of claim 1, wherein a key generation algorithm for generating the shared asymmetric key pair comprises an algorithm identical to an algorithm used by the further device.

6. The industrial automation system device of claim 1, wherein the pre-shared secret provides a sufficient entropy to derive the shared asymmetric key pair in a cryptographically secure way.

7. The industrial automation system device of claim 1, wherein the secure communication hardware processor is further configured to use a regular entropy source for generating the device asymmetric key pair.

8. The industrial automation system device of claim 1, further comprising: a certificate store comprising the device certificate; and a trust list comprising the shared certificate.

9. The industrial automation system device of claim 3, wherein the shared certificate related information of the pre-shared secret comprises one or more of the following: subject name, validity period, certificate signature algorithm, version, serial number, signature hash algorithm, issuer, public key, public key parameters, basic constraints, alternative name, subject key identifier, authority key identifier, key usage, and/or thumbprint.

10. The industrial automation system device of claim 3, wherein the shared certificate related information for the shared certificate and the device certificate of the pre-shared secret are each interpreted as an X.509 certificate.

11. The industrial automation system device of claim 1, wherein the pre-shared secret is provided to the device by pre-configuration or through an external access interface.

12. An industrial automation system, comprising:
at least one industrial automation system device that comprises:
- a secure communication hardware processor configured to communicate securely with a further trusted industrial automation system device; and
- a pre-shared secret module comprising a pre-shared secret, the pre-shared secret comprising shared asymmetric key pair generation data, wherein the secure communication hardware processor is configured to:
- derive a shared asymmetric key pair comprising a shared secret key and a shared public key from the shared asymmetric key pair generation data;
- derive a shared certificate comprising the shared public key;
- sign the shared certificate with the shared secret key;
- generate a device asymmetric key pair comprising a device secret key and a device public key; and
- derive a device certificate comprising the device public key and signed with the shared secret key.

13. The industrial automation system of claim 12, wherein at least the further trusted device comprises an identical pre-shared secret for deriving identical shared asymmetric key pairs and an identical shared certificate.

14. A method for secure communication in an industrial automation system, comprising:
- providing a pre-shared secret comprising asymmetric key pair generation data;
- deriving a shared asymmetric key pair comprising a shared secret key and a shared public key from the asymmetric key pair generation data;
- deriving a shared certificate comprising the shared public key;
- signing the shared certificate with the shared secret key;
- generating a device asymmetric key pair comprising a device secret key and a device public key; and
- deriving a device certificate comprising the device public key and signed with the shared secret key.

15. The method of claim 14, further comprising: trusting a further device based on the shared certificate and communicating securely with the further device based on the shared certificate and the device asymmetric key pair.

* * * * *